United States Patent Office 3,444,204
Patented May 13, 1969

3,444,204
PROCESS FOR THE PREPARATION OF
TERTIARY AMINES
Hartwig Schütt, Dusseldorf-Benrath, Germany, assignor to
Henkel & Cie. G.m.b.H., Dusseldorf-Holthausen, Germany, a corporation of Germany
No Drawing. Continuation-in-part of application Ser. No. 434,134, Feb. 19, 1965. This application Nov. 2, 1965, Ser. No. 506,134
Claims priority, application Germany, Nov. 6, 1964, H 54,233
Int. Cl. C07c *85/12*
U.S. Cl. 260—583                                    3 Claims

ABSTRACT OF THE DISCLOSURE

A process for the continuous production of higher-alkyl-tertiary amines which comprises the steps of continuously contacting in the gaseous phase an N,N-di-aliphatic-substituted higher fatty acid amide with at least a 50-fold excess of hydrogen at temperatures between about 200° C. and about 350° C., and pressures of between about 50 atmospheres to about 300 atmospheres in the presence of copper chromite as a catalyst, and recovering said higher-alkyl-tertiary amines.

---

This application is a continuation-in-part of my co-pending United States patent application Ser. No. 434,134, filed Feb. 19, 1965, now abandoned.

The present invention relates to a process for the continuous preparation of tertiary amines by means of catalytic hydrogenation of the corresponding N,N-di-substituted monocarboxylic acid amides.

Several processes for the preparation of tertiary amines, in particular, those which contain at least one higher alkyl radical are already known. However, the results of these processes are not satisfactory nor are they suitable for a technical preparation of the amines mentioned above.

According to Houben-Weyl "Methoden der org. Chemie," 4th Edition (1957), vol. XI/1, page 115, the reaction of aliphatic alcohols, as for example, dodecyl-alcohol, with dimethylamines is reported, but satisfactory yields have not been obtained. Furthermore, it is necessary to work with a greater excess of dimethylamine, about 8 times the volume amount or 24 times the mol amount, based on the alcohol used, in order to restrain the formation of olefins. After the reaction the excess dimethylamine must be recovered and requires, prior to its return in a continuous reaction, a pressure distillation for the purpose of removing the water formed in the reaction. Irrespective of this, the process is uneconomical for the simple reason that it starts out with the relatively expensive alkanols, which have to be recovered first by hydrogenation from higher fatty acids.

A further possibility for the preparation of trialkylamines is the methylation of primary alkylamines with methanol according to the process described in the German Patent No. 951,368. This process needs improvement in regard to its yields and it has the further disadvantage that it starts out with the expensive alkylamines, which in their turn have to be obtained from the corresponding acids by a series of process steps.

It has also been attempted to prepare alkylamines discontinuously in a pressure vessel by hydrogenation of acid amides at temperatures of 250° C. and at pressures of 200 to 300 atmospheres in the presence of copper-chromium oxide as catalyst and in the presence of solvents. However, these attempts have, according to the type of the acid amides used, lead either to failures or to very poor results, so that it was not possible, in particular when long-chain fatty acid amides were used as starting materials, to develop a process of commercial success. For example, Wojcik et al., J. Amer. Chem. Soc., 56, 2422 (1934), did not obtain diethyldodecylamine from lauric acid diethylamide, instead they obtained 64% of dodecylethylamine and 30% of di-n-dodecylamine. Only recently, Bogoslowski et al., ("Skelett-katalysatoren in der organischen Chemie," Berlin, 1960, page 77) asserted that they obtained dimethylalkylamines, although in yields of low percentage, by hydrogenation of the corresponding acid amides.

These negative results are most likely to be traced back to the pronounced tendency of the monocarboxylic acid dialkylamides to enter into re-amidation reactions at elevated temperatures. This type of reaction occurs very readily in liquid media at temperatures of 250–300° C., which temperatures are required for the hydrogenation of the acid amide to amines. Thus, with the discontinuous hydrogenation of lauric acid dimethylamide at higher temperatures in the liquid phase, the following cleavage-products, by-products and rearrangement-products may be anticipated: ammonia, monomethylamine, dimethylamine, dodecylamine, dodecylmethylamine, dodecyldimethylamine, unreacted lauric acid dimethylamide, lauric acid dodecylmethylamide, lauric acid monododecylamide, dilauroylimide, dilauroylmethylimide, didodecylmethylamine, didodecylamine, as well as tridodecylamine. These products were actually all found following the working method described by Wojcik et al.

An object of the present invention is the development of a continuous process for the production of higher-alkyl-tertiary-amines by direct hydrogenation of N,N-di-substituted aliphatic mono-carboxylic acid amides in excellent yields.

Another object of the present invention is the development of a process for the production of higher-alkyl-tertiary-amines which comprises the steps of contacting in the gaseous phase an acid amide of the formula

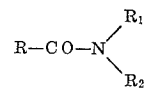

wherein R represents an alkyl having from 6 to 21 carbon atoms, an alkenyl having from 6 to 21 carbon atoms, an alkadienyl having from 6 to 21 carbon atoms, hydroxyalkyl having from 6 to 21 carbon atoms and hydroxyalkenyl having from 6 to 21 carbon atoms; and $R_1$ and $R_2$ represent alkyl having from 1 to 8 carbon atoms, hydroxy alkyl having from 1 to 8 carbon atoms, alkoxyalkyl having from 1 to 8 carbon atoms, phenyl, cyclohexyl, and, when taken together with the nitrogen, piperidinyl, pyrrolidinyl and morpholinyl, with at least a 50-fold excess of hydrogen at temperatures of between about 200° C. and about 350° C. in the presence of copper-chromite as a catalyst, and recovering said higher-alkyl-tertiary amine.

A further object of the present invention is the development of a process for the continuous production of higher-alkyl-di-lower-alkyl-amines which consists of the steps of continuously contacting in the gaseous phase a higher fatty acid N,N-di-lower-alkyl-amide with at least a 50-fold excess of hydrogen at temperatures of between about 200° C. and about 350° C. and pressures of between about 50 atmospheres to about 300 atmospheres in the presence of copper-chromite as a catalyst, separating of the excess hydrogen and recovering said higher-alkyl-di-lower-alkyl-amines.

These and other objects of the invention will become more apparent as the description thereof proceeds.

It has now been discovered that tertiary amines may be prepared with very good yields and without any formation of by-products worth mentioning by the direct hydrogenation of N,N-di-substituted monocarboxylic acid amides at elevated pressures and at temperatures between about 200° C. and about 350° C. in the presence of copper-chromite as a catalyst, when N,N-di-substituted amides of monocarboxylic acids with 8 to 22 carbon atoms are hydrogenated in the gaseous phase with at least a 50-fold excess of hydrogen. Preferably the process is conducted in the absence of additional material of a solvent nature, as in this way the working up of the reaction product is facilitaed. The hydrogenation may, however, be performed in the presence of solvents which, under the reaction conditions, are to be regarded as inert. Particularly suitable are saturated, aliphatic or cycloaliphatic hydrocarbons such as petroleum benzines with various boiling ranges, dimethylcyclohexane or decahydronaphthalene. Under the reaction conditions of the invention, while operating in the gaseous phase, these products are not solvents but, in face, inert diluents.

For the process according to the invention N,N-disubstituted amides of monocarboxylic acids with 8 to 22 carbon atoms are used as starting substances. As monocarboxylic acids are to be considered both the naturally occurring fatty acids as well as synthetic monocarboxylic acids of any origin, whose alkyl radical may be straight or branched. It is of no importance if the aliphatic hydrocarbon radical of the monocarboxylic acid is saturated or unsaturated. However, it is noted that unsaturated aliphatic radicals, in the process of the invention, are as a rule hydrogenated to saturated radicals.

The monocarboxylic acid amides serving as starting substances may have identical or different substituents attached to the nitrogen. Considered as substituents are preferably lower alkyl radicals with 1 to 8 carbon atoms which may be straight or branched. However, acid amides with aromatic or cycloaliphatic substituents are also suitable. Moreover, the substituents may in themselves be substituted, for example, by hydroxyl groups or ether radicals. It is also possible that the two substituents together with the nitrogen atom form a heterocyclic ring, for example, a piperidine or morpholine ring.

Suitable starting substances are, for example, caprylic acid dimethylamide, caprylic acid methylethylamide, caprylic acid diethylamide, capric acid dimethylamide, lauric acid dioctylamide, lauric acid diethanolamide, N-(lauroyl)-morpholide, lauric acid pentyloctylamide, oleic acid diethanolamide, linoleic acid diethylamide, ricinoleic acid dimethylamide, stearic acid diethylamide, N-(stearoyl)-piperidide, stearic acid di-isopropylamide, stearic acid octylisobutylamide, behenic acid dimethylamide, as well as mixtures of N,N-disubstituted fatty acid amides, as they are obtained from naturally occurring fats, for example, coconut fatty acid dimethylamide or diethylamide or tallow fatty acid dimethylamide.

For practical purposes those monocarboxylic acid amides are preferred as starting substances for the process of the invention which are substituted on the nitrogen atom by two methyl-, ethyl- or hydroxy-ethyl radicals.

The starting substances mentioned, are hydrogenated according to the invention with the customary copper-chromite catalysts as are, for example, utilized for the preparation of fatty alcohols by hydrogenation of fatty acids.

Hydrogen is used for the hydrogenation reaction in an at least 50-fold excess over the theoretic quantity, preferably the reaction is conducted with a 50- to 500-fold excess. In the individual case the hydrogen excess is adjusted relative to the volatility of the amides or the amides plus inert diluents to be hydrogenated.

Likewise, the pressure to be employed depends on the volatility of the amides or the amides plus inert diluents used. As a rule, it lies between 50 to 300 atmospheres pressure, preferably between 100 to 250 atmospheres. The reaction temperature is preferably adjusted to between 200° and 350° C.

The alcohols corresponding to the acids employed in the acid amide, which precipitate in the course of the process in small amounts as by-products, are formed by saponification of the acid amides due to the water formed in the reaction and hydrogenation and they are not perceptible in any disturbing way in the end product. However, if very pure products are desired, it is possible to counteract the formation of the alcohols either (1) by curtailing the reaction period, (2) by increasing the effective catalyst volume coupled with the lowering of the reaction temperature thus rendered possible, or (3) by increasing the excess of hydrogen.

The products obtained in accordance with the invention are suitable, either in the form of their salts or their quaternary products, for utilization as emulsifiers and flotation aids and also as starting products for the preparation of wetting agents and foam stabilizers.

The following examples shall serve for further illustration of the process of this invention, without, however, representing a restriction of its scope. They show that the process may be performed continuously with particular advantage. Of course, a discontinuous method of working is also possible.

EXAMPLE I

A continuously operating high pressure hydrogenation apparatus of customary construction, comprising a hydrogen heater, a heated reaction zone, a heat exchanger, separating flasks, a gas circulating pump and a fluid pump, was used for the hydrogenation reaction. The heated reaction zone of 14-liter capacity was filled with 16 kg. of Adkins copper-chromite in the form of 4 mm. tablets. The catalyst was then heated to 250° C. in the presence of the cycling hydrogen until termination of water separation. Next, while circulating hydrogen at a rate of 40 m.$^3$/hr., based on standard conditions, a mixture of fatty acid dimethylamides was passed through the catalyst-containing heated reaction zone at a pressure of 250 atmospheres and at a temperature of 230° C. at an amount of 1 liter per hour. This dimethylamide mixture had been prepared from naturally occurring coconut fatty acids and contained a mixture of fatty acid dimethylamides in proportion to their natural composition, namely, about 68% of lauric acid dimethylamide, about 24% of myristic acid dimethylamide and about 8% of palmitic acid dimethylamide, with an average molecular weight of 224. Altogether, 34 kg. of the amide mixture were reacted under these conditions.

The hydrogenation product which condensed in the separating flasks was collected and subjected to vacuum distillation. At a vacuum of 0.2 mm. of Hg within a range of 135–220° C., 31.2 kg. of an amine mixture were obtained, which on acidimetric titration showed an amine content of 98% and which on potentiometric titration showed a nitrogen content of 6.13%. The latter was composed of 6.11% of tertiary bonded nitrogen and of traces of primary and secondary bonded nitrogen. The theoretical content of tertiary bonded nitrogen for the dimethylalkylamines, calculated on the basis of the average molecular weight, amounted to 6.25%. The distillation residue weighed 1.4 kg. and consisted, as shown by potentiometric nitrogen titration, predominantly of dialkylmonomethylamines (3.56% of tertiary bonded nitrogen).

The experiment was discontinued voluntarily after hydrogenation of the 34 kg. of amide mixture mentioned, as there was no indication of a change regarding the results with further hydrogenation over the same catalyst.

EXAMPLE II

A smaller, continuously operating high pressure hydrogenation apparatus with a heated reaction zone of 600 ml. volume was filled with a copper-chromite catalyst in tablet form, and after the termination of the water displacement, it was filled with pure dodecanoic acid dimethylamide. At a pressure of 250 atmospheres and at a temperature of 250° C., about 200 ml. of dodecanoic acid dimethylamide were passed hourly over the catalyst in partly pre-evaporated condition with a hydrogen gas circulation of 4 m.³/hr., based on standard conditions.

From 1,400 gm. of dodecanoic acid dimethylamide used, 1,360 gm. of raw hydrogenation product were obtained, which was separated by fractional distillation into 1,280 gm. of dodecyldimethylamine and 80 gm. of distillation residue. On acidimetric titration the dodecyldimethylamine fraction showed a content of 94.2% of this amine. The remaining percentage components consisted predominantly of dodecyl alcohol. The residue was chiefly didodecylmonomethylamine.

EXAMPLE III

At a pressure of 250 atmospheres of $H_2$ and at a temperature of 280° C. the hydrogenation apparatus, described in Example II, was filled with caprylic acid dimethylamide and 200 ml./hr. of the acid amide was passed, together with 2 m.³ of $H_2$ per hour, based on standard conditions, over the copper-chromite catalyst.

After a through-put of 4.0 kg. of the acid amide, the amine, condensed in the separators, was subjected to a fractional distillation, whereby 3.540 kg. of octyldimethylamine were obtained in the boiling range of 86–90° C. at 10 mm., corresponding with a yield of 96% of the theory.

EXAMPLE IV

In the same hydrogenation apparatus as described in Example I, at a pressure of 250 atmospheres and at a temperature of 280° C., an 85% fatty diethanolamide, whose fatty acids consisted of the fatty acid mixture naturally occurring in coconut fatty acids was put through in an amount of 1 liter per hour with simultaneous passage of an amount of 40 m.³/hr. of hydrogen circulating gas, based on standard conditions. The remaining 15% of the fatty acid amide reactant consisted of the free fatty acids and their ammonium soaps as well as of fatty acid methylesters.

After the collected hydrogenation product had been dried over sodium sulfate, it was fractionally distilled. Within the boiling range of 100–130° C. at 1 mm., 300 gm. of the corresponding alkyldiethanolamines were obtained from 1 kg. of the starting material.

EXAMPLE V

In a hydrogenation apparatus, similar to Example II, 150 ml. of liquid, pure N-(n-caprylyl)-piperidide and 3 m.³ of hydrogen per hour, based on standard conditions, were passed over 1 liter of reduced copper-chromite catalyst in tablet form at a temperature of 235° C. and at a pressure of 260 atmospheres. The supply of the acid amide was introduced by means of a pressure pump. Care was taken for the continuous replacement of the circulating hydrogen gas consumed.

The reaction product, continuously drawn and released from the apparatus, showed, on acidimetric titration, a content of 88% of N-(n-octyl)-piperidine and consisted, corresponding with potentiometric titration results, only of tertiary amine. On subsequent fractional distillation, the N-(n-octyl)-piperidine had a boiling point of 98° C. at 4 mm. As a by-product n-octyl alcohol was obtained.

EXAMPLE VI

Similar to Example II, 150 ml. of N-(n-caprylyl)-morpholide and 3 m.³ of hydrogen per hour, based on standard conditions, were passed continuously over 1 liter of reduced copper-chromite catalyst in tablet form at a temperature of 230° C. and at a pressure of 250 atmospheres. The acidimetric titration showed in the reaction product a content of 83% of N-(n-octyl)-morpholine, which upon fractional distillation at a boiling point of 96° C. at 2 mm., passed over after a preliminary fraction of n-octanol.

EXAMPLE VII

According to Example V under analogous conditions pure N-(n-caprylyl)-N-methyl-aniline was hydrogenated to N-methyl-N-octylaniline, with a yield of 56%.

EXAMPLE VIII

The heated reaction zone of a smaller high pressure hydrogenation apparatus was filled with 800 ml. of a carrier catalyst containing 25% of copper chromite precipitated on 75% of silica gel. At a pressure of 250 atmospheres and at a temperature of 280° C., a mixture of 140 ml. of stearic acid dimethylamide and 260 ml. of decahydronaphthalene as well as 4 m.³ of hydrogen, based on standard conditions, were passed over this catalyst per hour.

After the reaction mixture was recovered and after the solvent was distilled, the raw tertiary amine product was fractionally distilled. Pure octadecyl dimethylamine was thus obtained in the boiling range of 145° to 150° C. at 1 mm., corresponding with a yield of 75% of the theory.

EXAMPLE IX

Under analogous working conditions as described in Example VIII, 800 ml. of Adkins copper-chromite catalyst in the form of 4 mm. tablets were filled into the heated reaction zone. At a pressure of 250 atmospheres and at a temperature of 270° C., a mixture of 200 ml. of petroleum benzine and 100 ml. of myristic acid dimethyl amide as well as 4 m.³ of hydrogen, based on standard conditions, were passed over the catalyst per hour. The catalyst had previously been heated to 250° C. in hydrogen until the separation of water was completed.

After recovering the reaction mixture and after distillation of the solvent, the raw tertiary amine was fractionally distilled. Tetradecyldimethylamine was obtained in the boiling range of 105° to 110° C. at 1 mm. with a yield of 72% of the theory.

EXAMPLE X

Analogous to the conditions described in Example I instead of 1 liter per hour of coconut fatty acid dimethylamides, a mixture of 0.5 liter of coconut fatty acid dimethylamides and 0.5 liter of dimethylcyclohexane was passed hourly into the apparatus.

After recovering the reaction mixture and after distillation of the dimethylcyclohexane, the raw alkyldimethylamines obtained were fractionated under vacuum, thereby obtaining coconut fatty alkyldimethylamines with a yield of 73% of the theory.

The preceding specific embodiments are illustrative of the process of the invention. It is obvious, however, that other expedients known to those skilled in the art may be employed.

I claim:

1. A process for the continuous production of higher-alkyl-tertiary amines which comprises the steps of continuously contacting in the gaseous phase an acid amide of the formula

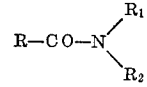

wherein R represents an alkyl having from 7 to 21 carbon atoms, an alkenyl having from 7 to 21 carbon atoms, an alkadienyl having from 7 to 21 carbon atoms, hydroxyalkyl having from 7 to 21 carbon atoms and hydroxyalkenyl having from 7 to 21 carbon atoms; and $R_1$ and $R_2$ represent alkyl having from 1 to 8 carbon atoms hydroxyalkyl having from 1 to 8 carbon atoms, and alkoxyalkyl having from 1 to 8 carbon atoms, with at least a 50-fold excess of hydrogen at temperatures of between about 200° C. and about 350° C. and pressures of between about 50 atmospheres to about 300 atmospheres in the presence of copper chromite as a catalyst, and recovering said higher-alkyl-tertiary amine.

2. The process of claim 1 wherein said hydrogenation is conducted in the absence of diluents.

3. A process for the continuous production of higher-alkyl-di-lower-alkyl-amines which consists of the steps of continuously contacting in the gaseous phase a higher fatty acid N,N-di-lower-alkyl-amide with at least a 50-fold excess of hydrogen at temperatures of between about 200° C. and about 350° C. and pressures of between about 50 atmospheres to about 300 atmospheres in the presence of copper chromite as a catalyst, separating the excess hydrogen and recovering said higher-alkyl-di-lower-alkylamines.

References Cited
UNITED STATES PATENTS

| | | | |
|---|---|---|---|
| 2,143,751 | 1/1939 | Adkins | 260—583 X |
| 3,190,922 | 6/1965 | Le Bard et al. | 260—583 X |

CHARLES B. PARKER, *Primary Examiner.*

R. L. RAYMOND, *Assistant Examiner.*

U.S. Cl. X.R.

260—247, 293, 563, 577